United States Patent
Xu et al.

(10) Patent No.: US 10,660,134 B2
(45) Date of Patent: May 19, 2020

(54) MTC UE RANDOM ACCESS METHOD AND DEVICE

(71) Applicant: CHINA ACADEMY OF TELECOMMUNICATIONS TECHNOLOGY, Beijing (CN)

(72) Inventors: Fangli Xu, Beijing (CN); Jianhua Liu, Beijing (CN); Xinyu Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 95 days.

(21) Appl. No.: 15/752,890

(22) PCT Filed: Jul. 11, 2016

(86) PCT No.: PCT/CN2016/089643
§ 371 (c)(1),
(2) Date: Feb. 14, 2018

(87) PCT Pub. No.: WO2017/028644
PCT Pub. Date: Feb. 23, 2017

(65) Prior Publication Data
US 2019/0174549 A1 Jun. 6, 2019

(30) Foreign Application Priority Data
Aug. 14, 2015 (CN) .......................... 2015 1 0502961

(51) Int. Cl.
*H04W 74/08* (2009.01)
*H04W 4/70* (2018.01)
*H04W 16/26* (2009.01)

(52) U.S. Cl.
CPC ......... *H04W 74/0833* (2013.01); *H04W 4/70* (2018.02); *H04W 74/08* (2013.01); *H04W 16/26* (2013.01)

(58) Field of Classification Search
CPC ... H04W 74/0833; H04W 4/70; H04W 74/08; H04W 16/26
See application file for complete search history.

(56) References Cited

U.S. PATENT DOCUMENTS 10,182,457 B2 * 1/2019 Wang ................ H04W 74/0833
10,271,355 B2 * 4/2019 Liu ....................... H04W 28/18
(Continued)

FOREIGN PATENT DOCUMENTS

CN 105101454 A 11/2014
CN 104349476 A 2/2015
(Continued)

OTHER PUBLICATIONS

State IP Office of the P.R. China—International Search Report of the International Searching Authority, with an English translation of the International Search Report, dated Sep. 22, 2016 for International Application No. PCT/CN2016/089643 (5 pgs).
(Continued)

*Primary Examiner* — Hashim S Bhatti
(74) *Attorney, Agent, or Firm* — Womble Bond Dickinson (US) LLP

(57) ABSTRACT

The present invention provides an MTC UE random access method and device. The method comprises: receiving indication information sent by a network side, the indication information being used for indicating at least one coverage enhancement level (CE LEVEL) and a physical random access channel (PRACH) resource corresponding thereto; selecting one CE LEVEL from a CE LEVEL of an MTC UE and the CE LEVEL indicated by the network side, and determining a PRACH resource corresponding to the CE LEVEL; and carrying out random access on the PRACH resource corresponding to the selected CE LEVEL. The present invention provides a mechanism of how to select a
(Continued)

---

301 — Receive indication information transmitted by the network side, where the indication information indicates at least one Coverage Enhancement (CE) level, and a Physical Random Access Channel (PRACH) resource corresponding to the at least one CE level 302 — Select one CE level from a CE level of the MTC UE, and the CE level indicated by the network side, and determine a PRACH resource corresponding to the selected CE level 303 — Initiate a random access over the PRACH resource corresponding to the selected CE level PRACH resource when a network side triggers an MTC UE to initiate a contention-free random access (CFRA) process.

18 Claims, 4 Drawing Sheets

(56) References Cited

U.S. PATENT DOCUMENTS

| | | | | |
|---|---|---|---|---|
| 2015/0016312 A1* | 1/2015 | Li | ............... | H04W 74/0833 370/280 |
| 2016/0295609 A1* | 10/2016 | Vajapeyam | ............... | H04L 5/14 |
| 2016/0373943 A1* | 12/2016 | Wang | ............... | H04W 24/02 |
| 2017/0318478 A1* | 11/2017 | Basu Mallick | ......... | H04W 4/70 |
| 2018/0063722 A1* | 3/2018 | Lee | ............... | H04W 16/26 |
| 2018/0092060 A1* | 3/2018 | Won | ............... | H04W 48/08 |

FOREIGN PATENT DOCUMENTS

| | | |
|---|---|---|
| WO | 2014055878 A1 | 4/2014 |
| WO | WO 2015/103874 A1 | 7/2015 |
| WO | 2015116732 A1 | 8/2015 |
| WO | WO 2015/116870 A1 | 8/2015 |

OTHER PUBLICATIONS

State IP Office of the P.R. China—Written Opinion of the International Searching Authority with an English translation dated Sep. 22, 2016 for International Application No. PCT/CN2016/089643 (11 pgs).

Extended European Search Report for counterpart EP Application No. 16836508.8, 11 pgs. (dated Jul. 4, 2018).

Nokia Networks: "Random Access Procedure for UEs in Coverage Enhancement," 3GPP Draft; R1-151317, $3^{rd}$ Generation Partnership Project (3GPP), Mobile Competence Centre; 650, Route Des Lucioles; F-06921 Sophia-Antipolis Cedex; France, vol. RAN WG1, No. Belgrade, Serbia; 20150420-20150424 Apr. 19, 2015, 3 pgs.

The Official Japanese Office Action for Application No. 2018-507692 dated Feb. 5, 2019, 4 pages.

* cited by examiner

MTC UE RANDOM ACCESS METHOD AND DEVICE

CROSS-REFERENCE TO RELATED APPLICATIONS

This patent application is a U.S. National Phase application under 35 U.S.C. § 371 of International Application No. PCT/CN2016/089643, filed on 11 Jul. 2016, entitled MTC UE RANDOM ACCESS METHOD AND DEVICE, which claims priority from and claims the benefit of Chinese Patent Application No. CN 201505029 61.7, filed with the Chinese Patent Office on Aug. 14, 2015 and entitled "Method and apparatus for a random access of an MTC UE", which was incorporated by reference in its entirety.

FIELD

The present invention relates to the field of communications, and particularly to a method and apparatus for a random access of an MTC UE.

BACKGROUND

1) Machine Type Communication (MTC)

As the internet of things is emerging, a support of MTC in a Long Term Evolution (LTE) system has been increasingly recognized. An enhanced physical layer project for MTC has been set up in the 3GPP Release 13. An MTC device (MTC terminal) may have a part of various Machine to Machine (M2M) communication characteristics, e.g., low mobility, a small amount of data to be transmitted, insensitivity to a communication delay, extremely low power consumption as required, and other characteristics. In order to lower a cost of the MTC terminal, a type of terminal supporting only a 1.4 MHz radio frequency bandwidth in the uplink and the downlink will be newly defined.

In the existing networks, the operators have identified that for a terminal operating in some scenario, e.g., a terminal operating in a basement, in a shopping mall, or at a corner of a building, a radio signal is seriously shielded, and the signal is greatly attenuated, so the terminal may not communicate with the network, but if a coverage area of the network is extended in such a scenario, then a cost of deploying the network will be greatly increased. Some test has showed that the existing coverage area needs to be enhanced to some extent. A feasible practice to enhance the coverage area is to apply repeated transmission or other similar technologies to the existing channels, and theoretically tens or hundreds of repeated transmission may be performed over the existing physical channels for some coverage gain.

2) Random Access Mechanisms in the LTE System

There are generally the following several reasons for a random access in the LTE system.

An access from a radio resource control idle RRC_IDLE state (also referred to as an initial access); a radio link fails, and RRC connection reestablishment is initiated (also an initial access); a random access is required for a handover procedure; there are downlink data arriving at a UE in an RRC_CONNECTED state; and there are uplink data arriving at a UE in an RRC_CONNECTED state.

In the case that there are downlink data arriving, and in the case that there is a handover, if there is a dedicated preamble, then a contention-free random access may be performed, where a process of the contention-free random access is as illustrated in FIG. 1, and generally includes the following three operations.

In the operation 1, an eNB transmits a message Msg0 to a UE.

The base station allocates for the UE a dedicated Random Access Preamble Index (ra-PreambleIndex) for a contention-free random access, and a Physical Random Access Channel (PRACH) resource Index (ra-PRACH-MaskIndex), where the values of ra-PRACH-MaskIndex are as depicted in Table 1. For a contention-free random access due to downlink data arriving, such information is carried using PDCELLH, and for a contention-free random access due to a handover, such information is carried using a handover order; and the information is transmitted to the UE via the message Msg0.

In the operation 2, the UE transmits a message Msg1 to the eNB.

The UE transmits a specified dedicated preamble to the eNB over the specified PRACH resource according to the ra-PreambleIndex and the ra-PRACH-MaskIndex indicated in the Msg0. The eNB calculates an uplink Timing Advance (TA) according to the Msg1 upon reception of the Msg1.

In the operation 3, the eNB transmits a message Msg2 to the UE.

The eNB transmits a random access response to the UE via the Msg2, where the random access response includes information about the timing advance, and notifies the UE of the timing advance for subsequent uplink transmission.

A contention random access can be applicable to random accesses due to all other random access reasons, and a procedure of the contention random access is as depicted in FIG. 2, and generally includes the following four operations.

In the operation 1, the UE transmits a message Msg1 to the eNB.

The UE selects a preamble for a random access, and a PRACH resource, and transmits the selected preamble for a random access to the eNB via the Msg1 over the PRACH resource.

In the operation 2, the eNB transmits a message Msg2 to the UE.

The eNB receives the preamble, calculates an uplink Timing Advance (TA), and transmits a random access response to the UE via the Msg2, where the random access response at least includes information about the timing advance, and information about an uplink scheduling grant for a message Msg3.

In the operation 3, the UE transmits the message Msg3 to the eNB.

The UE transmits in the uplink via the Msg3 over the UL grant specified in the Msg2, where different information items are transmitted in the uplink via the Msg3 due to different random access reasons, for example, an RRC Connection Setup Request is transmitted via the Msg3 for an initial access.

In the operation 4, the eNB transmits a message Msg4 to the UE.

The Msg4 is a contention resolution message, and the UE may determine from the Msg4 whether the random access succeeds.

When there is a handover, or there are downlink data arriving, the network side may trigger the UE to initiate a contention-free random access procedure, when there are insufficient PRACH resources at the network side, the network side may alternatively trigger the UE via a message Msg0 to initiate a contention random access directly, where ra-PreambleIndex is particularly set to 000000.

TABLE 1

Values of PRACH Mask Index

| PRACH Mask index | Allowed PRACH (FDD) | Allowed PRACH (TDD) |
|---|---|---|
| 0 | All | All |
| 1 | PRACH resource index 0 | PRACH resource index 0 |
| 2 | PRACH resource index 1 | PRACH resource index 1 |
| 3 | PRACH resource index 2 | PRACH resource index 2 |
| 4 | PRACH resource index 3 | PRACH resource index 3 |
| 5 | PRACH resource index 4 | PRACH resource index 4 |
| 6 | PRACH resource index 5 | PRACH resource index 5 |
| 7 | PRACH resource index 6 | Reserved |
| 8 | PRACH resource index 7 | Reserved |
| 9 | PRACH resource index 8 | Reserved |
| 10 | PRACH resource index 9 | Reserved |
| 11 | Every, in the time domain, even PRACH opportunity $1^{st}$ PRACH Resource Index in sub-frame | Every, in the time domain, even PRACH opportunity $1^{st}$ PRACH Resource Index in sub-frame |
| 12 | Every, in the time domain, odd PRACH opportunity $1^{st}$ PRACH Resource Index in sub-frame | Every, in the time domain, odd PRACH opportunity $1^{st}$ PRACH Resource Index in sub-frame |
| 13 | Reserved | $1^{st}$ PRACH resource index in sub-frame |
| 14 | Reserved | $2^{nd}$ PRACH resource index in sub-frame |
| 15 | Reserved | $3^{rd}$ PRACH resource index in sub-frame |

3) A Random Access Channel (RACH) Transmission Mechanism in Low-Complexity MTC (LC MTC)

In order to improve the performance of transmission in an enhanced coverage area, repeated transmission needs to be performed for a number of times. For the random access procedure, the scheduling signaling of the messages in the respective operations, the messages per se, and their corresponding feedback information need to be transmitted repeatedly. The same category of message is required to be transmitted repeatedly for different numbers of time at different Coverage Enhancement (CE) Levels, so it has been ascertained at the RAN2#90 session that there are different transmission resources (PRACH resources) for transmitting the Msg1 at the different CE levels, and the UE may determine the current CE LEVEL of the UE according to its current circumstance (e.g., Radio Resource Management (RRM) measurement, etc.), and then select a PRACH resource at the CE level to transmit the Msg1.

For a random access procedure initiated by the UE on its own initiative, when a success ratio of transmitting a preamble at the same CE level reaches a pre-configured number of transmissions, but the preamble still fails to be transmitted, the UE need to raise the CE level by one level, and select a PRACH resource at the one-level higher CE level to transmit the preamble.

Apparently in the existing transmission process during a random access in an enhanced coverage area, the PRACH resource for a random access initiated by the UE on its own initiative is dependent upon the current CE level of the UE; and in a random access procedure initiated by the UE as a result of being triggered by the network side, the PRACH resource is determined by the network side. Since the network side triggers the UE to initiate a random access procedure, primarily for downlink data arriving or a handover, these two procedures are common in that no data have been transmitted for a long period of time, or no data have ever been transmitted, between the UE and the target eNB. In the case that no data have been transmitted for a long period of time, it is difficult for the eNB at the network side to get timely and accurate knowledge of the current CE level of the UE. There has been absent so far a specific solution to selecting a PRACH resource by the UE in this case.

SUMMARY

Embodiments of the invention provide a method and apparatus for a random access of an MTC UE so as to provide a mechanism for selecting a PRACH resource when the network side triggers the MTC UE to initiate a Contention-Free Random Access (CFRA) procedure.

An embodiment of the invention provides a method for a random access of a Machine Type Communication (MTC) User Equipment (UE), the method including:

receiving indication information transmitted by a network side, wherein the indication information indicates at least one Coverage Enhancement (CE) level, and a Physical Random Access Channel (PRACH) resource corresponding to the at least one CE level;

selecting one CE level from a CE level of the MTC UE, and the CE level indicated by the network side, and determining a PRACH resource corresponding to the selected CE level; and initiating a random access over the PRACH resource corresponding to the selected CE level.

Preferably receiving the indication information transmitted by the network side includes:

receiving the indication information transmitted by the network side via a Physical Downlink Control Channel (PDCCH) order.

Preferably selecting one CE level from the CE level of the MTC UE, and the CE level indicated by the network side, and determining the PRACH resource corresponding to the selected CE level includes:

selecting the CE level of the MTC UE when the current CE level of the MTC UE is among the CE levels indicated by the network side; and selecting the PRACH resource corresponding to the selected CE level indicated by the network side according to the CE level of the MTC UE.

Preferably the indication information indicates each CE level, and a PRACH resource corresponding to each CE level.

Preferably the indication information indicates a plurality of CE levels, and their corresponding PRACH resources; and selecting one CE level from the CE level of the MTC UE, and the CE levels indicated by the network side, and determining a PRACH resource corresponding to the selected CE level includes:

selecting such one of the CE levels indicated by the network side that has a most approximate coverage gain to the CE level of the MTC UE when the CE level of the MTC UE is not among the CE levels indicated by the network side; and determining the PRACH resource corresponding to the selected CE level indicated by the network side according to the selected CE level.

Preferably the indication information indicates a plurality of CE levels, and their corresponding PRACH resources; and selecting one CE level from the CE level of the MTC UE, and the CE levels indicated by the network side, and determining a PRACH resource corresponding to the CE level includes:

selecting the CE level of the MTC UE, when the CE level of the MTC UE is not among the CE levels indicated by the network side, and a coverage gain of the CE level of the MTC UE is lower than all the CE levels indicated by the network side; and determining a PRACH resource corresponding to the CE level of the MTC UE according to a mechanism for selecting a resource of a contention random access resource.

Preferably the indication information indicates a plurality of CE levels, and their corresponding PRACH resources; and selecting one CE level from the CE level of the MTC UE, and the CE levels indicated by the network side, and determining the PRACH resource corresponding to the selected CE level includes:

selecting one of the CE levels indicated by the network side, when the CE level of the MTC UE is not among the CE levels indicated by the network side, and a coverage gain of the CE level of the MTC UE is higher than all the CE levels indicated by the network side; and determining the PRACH resource corresponding to the selected CE level indicated by the network side according to the selected CE level.

Preferably the indication information indicates one CE level, and a PRACH resource corresponding to the one CE level; and selecting one CE level from the CE level of the MTC UE, and the CE level indicated by the network side, and determining a PRACH resource corresponding to the selected CE level includes:

selecting the CE level indicated by the network side when the CE level indicated by the network side is not the CE level of the MTC UE; and determining the PRACH resource corresponding to the selected CE level indicated by the network side according to the selected CE level.

Preferably the indication information indicates one CE level, and a PRACH resource corresponding to the one CE level; and selecting one CE level from the CE level of the MTC UE, and the CE level indicated by the network side, and determining a PRACH resource corresponding to the selected CE level includes:

selecting the CE level indicated by the network side when the CE level indicated by the network side is not the CE level of the MTC UE, and a coverage gain of the CE level of the MTC UE is higher than the CE level indicated by the network side; and determining the PRACH resource corresponding to the selected CE level indicated by the network side according to the selected CE level.

Preferably the indication information indicates one CE level, and a PRACH resource corresponding to the one CE level; and selecting one CE level from the CE level of the MTC UE, and the CE level indicated by the network side, and determining a PRACH resource corresponding to the selected CE level includes:

selecting the CE level of the MTC UE, when the CE level indicated by the network side is not the CE level of the MTC UE, and a coverage gain of the CE level of the MTC UE is lower than all the CE levels indicated by the network side; and determining a PRACH resource corresponding to the CE level of the MTC UE according to a mechanism for selecting a resource of a contention random access.

Preferably when the random access fails to be initiated over the PRACH resource corresponding to the selected CE level, the method further includes:

transitioning to a CE level with a coverage gain higher by one level; and when it is determined that the higher CE level is among the CE levels indicated by the network side, determining the PRACH resource corresponding to the higher CE level indicated by the network side according to the higher CE level, and initiating a contention-free random access over the PRACH resource; otherwise, selecting a PRACH resource according to a mechanism for selecting a resource of a contention random access, and initiating a contention random access.

Preferably the indication information indicates the respective CE levels, and their corresponding PRACH resources in any one of the following schemes:

the indication information indicates indexes of the respective CE levels, and their corresponding preamble indexes and PRACH mask indexes;

the indication information indicates combination indexes of combinations of the respective CE levels, and their corresponding PRACH resources, wherein the combination of each CE level, and its corresponding PRACH resource is pre-configured or prescribed in a protocol, and the combination index corresponding to each combination is pre-configured or prescribed in a protocol; and the indication information indicates indexes of the respective CE levels, and their corresponding PRACH mask indexes, wherein the preamble indexes corresponding to the respective CE levels are pre-configured.

An embodiment of the invention further provides a method for triggering a random access of an MTC UE by the network side, the method including:

transmitting indication information to the MTC UE, wherein the indication information indicates at least one Coverage Enhancement (CE) level, and a Physical Random Access Channel (PRACH) resource corresponding to the at least one CE level; and receiving a random access initiated by the MTC UE over a PRACH resource corresponding to a selected CE level.

Preferably transmitting the indication information to the MTC UE includes:

transmitting the indication information to the MTC UE via a Physical Downlink Control Channel (PDCCH) order.

Preferably the indication information indicates each protocol prescribed CE level, and its corresponding PRACH resource prescribed in a protocol; or the indication information indicates a plurality of CE levels, and their corresponding PRACH resources prescribed in a protocol; or the indication information indicates one CE level, and its corresponding PRACH resource prescribed in a protocol.

Preferably the indication information indicates the respective CE levels, and their corresponding PRACH resources in any one of the following schemes:

the indication information indicates indexes of the respective CE levels, and their corresponding preamble indexes and PRACH mask indexes;

the indication information indicates combination indexes of combinations of the respective CE levels, and their corresponding PRACH resources, wherein the combination of each CE level, and its corresponding PRACH resource is pre-configured or prescribed in a protocol, and the combination index corresponding to each combination is pre-configured or prescribed in a protocol; and the indication information indicates indexes of the respective CE levels, and their corresponding PRACH mask indexes, wherein the preamble indexes corresponding to the respective CE levels are pre-configured.

An embodiment of the invention provides a Machine Type Communication (MTC) User Equipment (UE) including:

a receiving unit configured to receive indication information transmitted by a network side, wherein the indication information indicates at least one Coverage Enhancement (CE) level, and a Physical Random Access Channel (PRACH) resource corresponding to the at least one CE level;

a selecting unit configured is to select one CE level from a CE level of the MTC UE, and the CE level indicated by the network side, and determine a PRACH resource corresponding to the selected CE level; and a random access unit configured to initiate a random access over the PRACH resource corresponding to the selected CE level.

Preferably the selecting unit configured to select one CE level from the CE level of the MTC UE, and the CE level indicated by the network side, and determine the PRACH resource corresponding to the CE level is configured to:

select the CE level of the MTC UE when the current CE level of the MTC UE is among the CE levels indicated by the network side; and select the PRACH resource corresponding to the selected CE level indicated by the network side according to the CE level of the MTC UE.

Preferably the indication information indicates each CE level, and a PRACH resource corresponding to each CE level.

Preferably the indication information indicates a plurality of CE levels, and their corresponding PRACH resources; and the selecting unit configured to select one CE level from the CE level of the MTC UE, and the CE levels indicated by the network side, and determine the PRACH resource corresponding to the CE level is configured to:

select such one of the CE levels indicated by the network side that has a most approximate coverage gain to the CE level of the MTC UE, when the CE level of the MTC UE is not among the CE levels indicated by the network side; and determine the PRACH resource corresponding to the selected CE level indicated by the network side according to the selected CE level.

Preferably the indication information indicates a plurality of CE levels, and their corresponding PRACH resources; and the selecting unit configured to select one CE level from the CE level of the MTC UE, and the CE levels indicated by the network side, and determine the PRACH resource corresponding to the CE level is configured to:

select the CE level of the MTC UE, when the CE level of the MTC UE is not among the CE levels indicated by the network side, and a coverage gain of the CE level of the MTC UE is lower than all the CE levels indicated by the network side; and determine a PRACH resource corresponding to the CE level of the MTC UE according to a mechanism for selecting a resource of a contention random access resource.

Preferably the indication information indicates a plurality of CE levels, and their corresponding PRACH resources; and the selecting unit configured to select one CE level from the CE level of the MTC UE, and the CE levels indicated by the network side, and determine the PRACH resource corresponding to the CE level is configured to:

select one of the CE levels indicated by the network side, when the CE level of the MTC UE is not among the CE levels indicated by the network side, and a coverage gain of the CE level of the MTC UE is higher than all the CE levels indicated by the network side; and determine the PRACH resource corresponding to the selected CE level indicated by the network side according to the selected CE level.

Preferably the indication information indicates one CE level, and a PRACH resource corresponding to the one CE level; and the selecting unit configured to select one CE level from the CE level of the MTC UE, and the CE level indicated by the network side, and determine the PRACH resource corresponding to the CE level is configured to:

select the CE level indicated by the network side when the one CE level indicated by the network side is not the CE level of the MTC UE; and determine the PRACH resource corresponding to the selected CE level indicated by the network side according to the selected CE level.

Preferably the indication information indicates one CE level, and a PRACH resource corresponding to the one CE level; and the selecting unit configured to select one CE level from the CE level of the MTC UE, and the CE level indicated by the network side, and determine the PRACH resource corresponding to the selected CE level is configured to:

select the CE level indicated by the network side when the one CE level indicated by the network side is not the CE level of the MTC UE, and a coverage gain of the CE level of the MTC UE is higher than the CE level indicated by the network side; and determine the PRACH resource corresponding to the selected CE level indicated by the network side according to the selected CE level.

Preferably the indication information indicates one CE level, and a PRACH resource corresponding to the one CE level; and the selecting unit configured to select one of the CE level of the MTC UE, and the CE level indicated by the network side, and determine the PRACH resource corresponding to the CE level is configured to:

select the CE level of the MTC UE, when the one CE level indicated by the network side is not the CE level of the MTC UE, and a coverage gain of the CE level of the MTC UE is lower than the CE levels indicated by the network side; and determine a PRACH resource corresponding to the CE level of the MTC UE according to a mechanism for selecting a resource of a contention random access.

Preferably the random access unit is further configured, when the random access fails to be initiated over the PRACH resource corresponding to the selected CE level, to:

transition to a CE level with a coverage gain higher by one level; and when it is determined that the higher CE level is among the CE levels indicated by the network side, determine the PRACH resource corresponding to the higher CE level indicated by the network side according to the higher CE level, and initiate a contention-free random access over the PRACH resource; otherwise, select a PRACH resource according to a mechanism for selecting a resource of a contention random access, and to initiate a contention random access.

Preferably the indication information indicates the respective CE levels, and their corresponding PRACH resources in any one of the following schemes:

the indication information indicates indexes of the respective CE levels, and their corresponding preamble indexes and PRACH mask indexes;

the indication information indicates combination indexes of combinations of the respective CE levels, and their corresponding PRACH resources, wherein the combination of each CE level, and its corresponding PRACH resource is pre-configured or prescribed in a protocol, and the combination index corresponding to each combination is pre-configured or prescribed in a protocol; and the indication information indicates indexes of the respective CE levels, and their corresponding PRACH mask indexes, wherein the preamble indexes corresponding to the respective CE levels are pre-configured.

An embedment of the invention further provides a network-side device for triggering a random access of an MTC UE, the device including:

an indicating unit configured to transmit indication information to the MTC UE, wherein the indication information indicates at least one Coverage Enhancement (CE) level, and a Physical Random Access Channel (PRACH) resource corresponding to the at least one CE level; and a receiving unit configured to receive a random access initiated by the MTC UE over a PRACH resource corresponding to a selected CE level.

Preferably the indication information indicated by the indicating unit indicates each CE level, and its corresponding PRACH resource prescribed in a protocol; or the indication information indicated by the indicating unit indicates a plurality of CE levels, and their corresponding PRACH resources prescribed in a protocol; or the indication information indicated by the indicating unit indicates one CE level, and its corresponding PRACH resource prescribed in a protocol.

Preferably the indicating unit indicates the respective CE levels, and their corresponding PRACH resources in any one of the following schemes:

the indicating unit indicates indexes of the respective CE levels, and their corresponding preamble indexes and PRACH mask indexes;

the indicating unit indicates combination indexes of combinations of the respective CE levels, and their corresponding PRACH resources, wherein the combination of each CE level, and its corresponding PRACH resource is pre-configured or prescribed in a protocol, and the combination index corresponding to each combination is pre-configured or prescribed in a protocol; and the indicating unit indicates indexes of the respective CE levels, and their corresponding PRACH mask indexes, wherein the preamble indexes corresponding to the respective CE levels are pre-configured.

The methods and apparatuses for a random access of an MTC UE according to the embodiments of the invention have the following advantageous effects.

When the network side triggers the MTC UE to initiate a Contention-Free Random Access (CFRA) procedure, the MTC UE selects one CE level from the CE levels specified by the network side, and the CE level of the MTC UE, and initiates a random access procedure over the PRACH resource corresponding to the selected CE level, thus addressing the problem of how the UE selects a PRACH resource for a random access when the UE is triggered by the network side to initiate the random access.

DETAILED DESCRIPTION OF THE EMBODIMENTS

Figure 1:
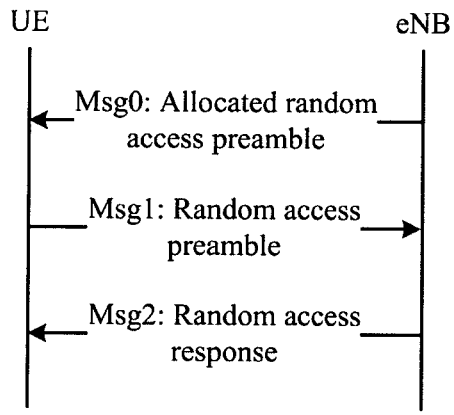
FIG. 1 is a schematic diagram of a contention-free random access procedure in the prior art.
Figure 2:
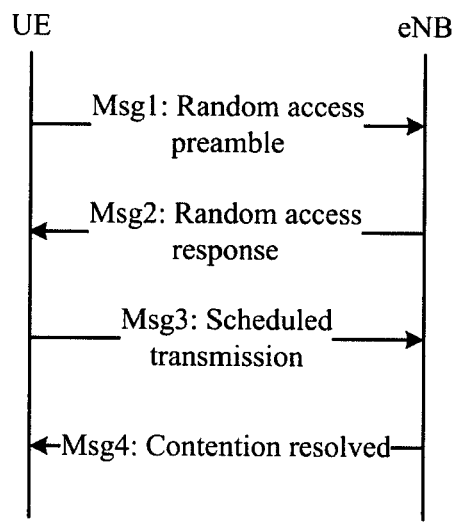
FIG. 2 is a schematic diagram of a contention random access procedure in the prior art.

A method and apparatus for a random access of an MTC UE according to the invention will be described below in further details with reference to the drawings, and the embodiments thereof.

In the following description, firstly an implementation with cooperation of the network side and the user equipment side will be described, and then implementations at the network side and the user equipment side will be described respectively, but this will not suggest required cooperation of both the sides for an implementation, and in fact, problems present respectively at the network side and the user equipment side will also be addressed in the separate implementations at the network side and the user equipment side, although a better technical effect may be achieved in the implementation with cooperation of both the sides.

The embodiments of the invention provide a method for triggering a random access of a Machine Type Communication (MTC) User Equipment (UE) by the network side, and a method for a random access of an MTC UE, which generally include the following operations.

In the operation 1, the network side transmits indication information to the MTC UE, where the indication information indicates at least one Coverage Enhancement (CE) level, and a Physical Random Access Channel (PRACH) resource corresponding to at least one CE level.

The network side triggers the UE to initiate a contention-Free random access procedure, where the network side allocates the PRACH resource for the UE, and in this embodiment, the network side may indicate the at least one CE level, and its corresponding PRACH resource to the MTC UE.

Preferably the network side may transmit the indication information to the MTC UE via a Physical Downlink Control Channel (PDCCH) order without any limitation thereto.

The PDCCH order of the network side includes CE levels in a set, or a subset thereof prescribed in a protocol, and PRACH resources corresponding to the CE levels.

In the operation 2, the MTC UE receives the indication information transmitted by the network side, where the indication information indicates the at least one Coverage Enhancement (CE) level, and its corresponding Physical Random Access Channel (PRACH) resource.

Preferably the MTC CE receives the indication information transmitted by the network side via the PDCCH order.

In the operation 3, the MTC UE selects one CE level from a CE level of the MTC UE, and the CE level indicated by the network side, and determines a PRACH resource corresponding to the CE level.

The UE may determine the current CE level of the UE according to its current circumstance (e.g., RRM measurement, etc.), and also the network side further indicates the PRACH resource of the at least one CE level, so the UE may select one of the CE levels according to some mechanism, and determine the PRACH resource corresponding to the CE level.

In the operation 4, the MTC UE initiates a random access over the PRACH resource corresponding to the selected CE level.

In the operation 5, the network side receives the random access initiated by the MTC UE over the PRACH resource corresponding to the selected CE level.

Preferably selecting one CE level from the CE level of the MTC UE, and the CE level indicated by the network side in the following mechanism.

The CE level to be selected is determined according to whether the current CE level of the MTC UE is among the CE levels indicated by the network side.

In a first instance, the MTC CE determines that the current CE level of the MTC UE is among the CE levels indicated by the network side.

The MTC UE selects the CE level of the MTC UE, selects the PRACH resource corresponding to the CE level indicated by the network side according to the CE level of the MTC UE, and initiates a Contention-Free Random Access (CFRA) procedure over the corresponding PRACH resource.

In a second instance, when the MTC CE determines that the current CE level of the MTC UE is not among the CE levels indicated by the network side, then the MTC CE may determine one CE level as follows.

1) The MTC UE selects the CE level of the MTC UE, determines a PRACH resource for the CE level of the MTC UE according to a mechanism for selecting a resource of a contention random access, and initiates a Contention-Free Random Access (CFRA) over the PRACH resource.

2) The MTC UE selects such one CE level from the CE levels indicated by the network side that has the most approximate coverage gain to the CE level of the MTC UE, determines the PRACH resource corresponding to the selected CE level indicated by the network side according to the selected CE level, and initiates a CFRA over the PRACH resource.

There are different coverage gains corresponding to different CE levels, and the selected CE level with the most approximate coverage gain to the CE level of the MTC UE may have a higher coverage gain than that of the CE level of the MTC UE, or may have a lower coverage gain than that of the CE level of the MTC UE.

Further preferably, the CE level with such a coverage gain that is lower than that of the CE level of the MTC UE, and that is the most approximate to the CE level of the MTC UE.

3) The MTC UE decides to select the CE level of the MTC UE, or one of the CE levels indicated by the network side according to whether the CE level of the MTC UE has a higher or lower coverage gain than the CE levels indicated by the network side.

When the CE level of the MTC UE is not among the CE levels indicated by the network side, and the coverage gain of the CE level of the MTC UE is lower than all the CE levels indicated by the network side, selecting the CE level of the MTC U; and determining a PRACH resource corresponding to the CE level of the MTC UE according to a mechanism for selecting a resource of a contention random access resource.

Or, when the CE level of the MTC UE is not among the CE levels indicated by the network side, and the coverage gain of the CE level of the MTC UE is higher than all the CE levels indicated by the network side, selecting one of the CE levels indicated by the network side; and determining the PRACH resource corresponding to the selected CE level indicated by the network side according to the selected CE level.

Preferred implementations, in which a PRACH resource is selected by the network side, corresponding to different indication schemes, are described as follows.

1) The network side indicates each CE level prescribed in a protocol, and the PRACH resource corresponding to each CE level via a PDCCH order.

Since the network side indicates all the CE levels, and their corresponding PRACH resources, the CE level of the MTC UE is sure to be among the CE levels indicated by the network side, so the CE level of the CE level is selected for use.

The MTC UE determines the PRACH resource corresponding to the CE level indicated by the network side according to the CE level of the MTC UE, transmits the Msg1 over the PRACH resource, and determines other configuration of the CE level in the current RACH procedure.

2) The network side indicates a plurality of CE levels prescribed in the protocol, and their corresponding PRACH resources via a PDCCH order.

The network side may indicate all of the CE levels, or may indicate a part of the CE levels.

In a first approach, there are the following two instances according to whether the CE level of the MTC UE is among the CE levels indicated by the network side.

In a first instance, the CE level of the MTC UE is among the CE levels indicated by the network side.

The MTC UE selects the CE level of the MTC UE for use; and determines the PRACH resource corresponding to the CE level of the MTC UE indicated by the network side according to the CE level, transmits the Msg1 over the PRACH resource, and determines other configuration of the CE level in the current RACH procedure.

In a second instance, the CE level of the MTC UE is not among the CE levels indicated by the network side, so the MTC UE proceeds as follows.

The MTC UE selects such one of the CE levels indicated by the network side that has the most approximate coverage gain to the CE level of the MTC UE; and determines the PRACH resource corresponding to the selected CE level indicated by the network side according to the selected CE level, transmits the Msg1 over the PRACH resource, and obtains other corresponding RACH related configuration of the CE level according to the CE level.

Or, when the coverage gain of the CE level of the MTC UE is lower than all the CE levels indicated by the network side, the MTC UE selects the CE level of the MTC UE; and determines a PRACH resource corresponding to the CE level of the MTC UE according to a mechanism for selecting a resource of a contention random access, and initiates a contention random access over the corresponding PRACH resource.

Or, when the coverage gain of the CE level of the MTC UE is higher than all the CE levels indicated by the network side, the MTC UE selects one CE level from the CE levels indicated by the network side; and determines the PRACH resource corresponding to the selected CE level indicated by the network side according to the selected CE level. The MTC UE transmits the Msg1 over the PRACH resource, and obtains other corresponding RACH related configuration of the CE level according to the CE level. Preferably the MTC UE may select the CE level with the most approximate coverage gain to the CE level of the MTC UE.

3) The network side indicates one CE level prescribed in the protocol, and its corresponding PRACH resource via a PDCCH order.

In a first instance, when the one CE level indicated by the network side is the CE level of the MTC UE, the MTC UE selects the CE level of the MTC UE; and determines the PRACH resource corresponding to the CE level of the MTC UE indicated by the network side according to the CE level, transmits the Msg1 over the PRACH resource, and determines other configuration of the CE level in the current RACH procedure.

In a second instance, when the one CE level indicated by the network side is not the CE level of the MTC UE, the CE level to be selected may be determined in the following mechanism.

The MTC UE selects the CE level indicated by the network side, and determines the PRACH resource corresponding to the CE level indicated by the network side, transmits the Msg1 over the PRACH resource, and determines other configuration of the CE level in the current RACH procedure.

Or, when the coverage gain of the CE level of the MTC UE is higher than all the CE levels indicated by the network side, the MTC UE selects one of the CE levels indicated by the network side; and transmits the Msg1 over the PRACH resource according to the PRACH resource corresponding to the selected CE level indicated by the network side, and obtains other corresponding RACH related configuration of the CE level according to the CE level.

Or, when the coverage gain of the CE level of the MTC UE is lower than all the CE levels indicated by the network side, the MTC UE selects the CE level of the MTC UE; and determines a PRACH resource corresponding to the CE level of the MTC UE according to a mechanism for selecting a resource of a contention random access, and initiates a contention random access over the corresponding PRACH resource.

Preferably when the MTC UE fails to initiate the random access over the PRACH resource corresponding to the selected CE level, the MTC UE further proceeds as follows.

The MTC UE transitions to a CE level with a coverage gain higher by one level; and when it is determined that the higher CE level is among the CE levels indicated by the network side, the MTC UE determines the PRACH resource corresponding to the higher CE level indicated by the network side according to the CE level, and initiates a contention-free random access over the PRACH resource; otherwise, the MTC UE selects a PRACH resource according to the mechanism for selecting a resource of a contention random access, and initiates a contention random access.

Preferably the indication information transmitted by the network side indicates the respective CE levels, and their corresponding PRACH resources in any one of the following schemes.

In a first scheme, the indication information indicates indexes of the respective CE levels, and their corresponding preamble indexes and PRACH mask indexes.

In a second scheme, the indication information indicates combination indexes of combinations of the respective CE levels, and their corresponding PRACH resources, where the combination of each CE level, and its corresponding PRACH resource is pre-configured or prescribed in the protocol, and the combination index corresponding to each combination is pre-configured or prescribed in the protocol.

In a third scheme, the indication information indicates indexes of the respective CE levels, and their corresponding PRACH mask indexes, where the preamble indexes corresponding to the respective CE levels are pre-configured.

Figure 3:
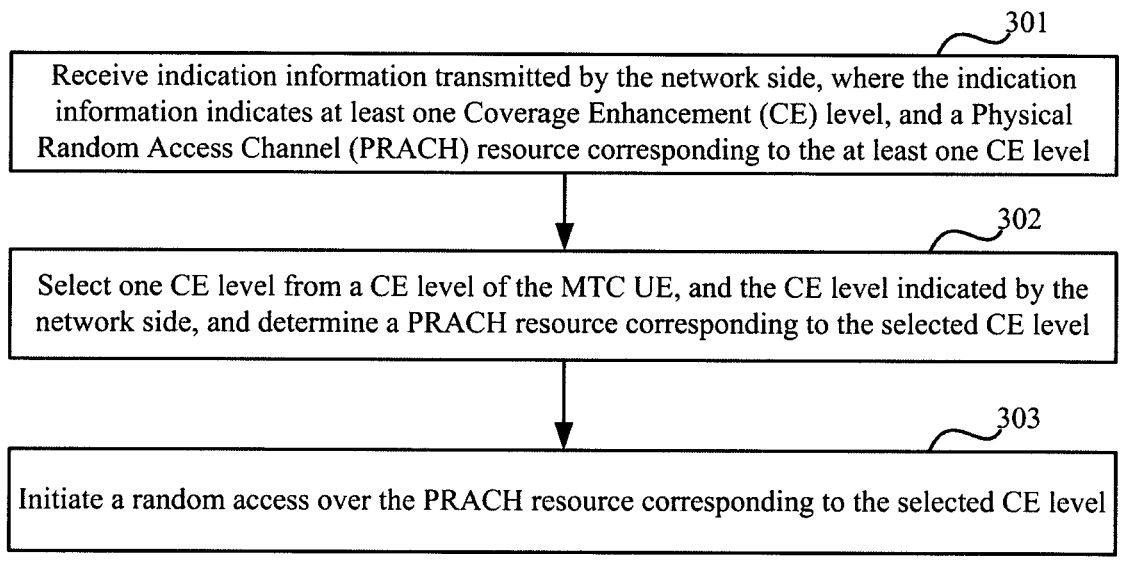
FIG. 3 is a flow chart of a method for a random access of an MTC UE according to an embodiment of the invention.

FIG. 3 illustrates a method for a random access of a Machine Type Communication (MTC) User Equipment (UE) at the UE side, which includes the following operations.

The operation 301 is to receive indication information transmitted by the network side, where the indication information indicates at least one Coverage Enhancement (CE) level, and the Physical Random Access Channel (PRACH) resource corresponding to the at least one CE level.

The operation 302 is to select one CE level from a CE level of the MTC UE, and the CE level indicated by the network side, and to determine a PRACH resource corresponding to the selected CE level.

The operation 303 is to initiate a random access over the PRACH resource corresponding to the selected CE level.

Figure 4:
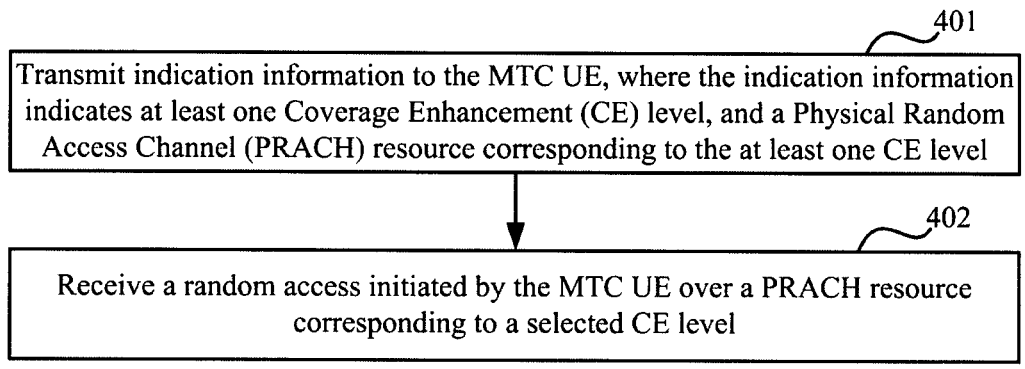
FIG. 4 is a flow chart of a method for triggering a random access of an MTC UE by the network side according to an embodiment of the invention.

An embodiment of the invention further provides a method for triggering a random access of an MTC UE by the network side, and as illustrated in FIG. 4, the method includes the following operations.

The operation 401 is to transmit indication information to the MTC UE, where the indication information indicates at least one Coverage Enhancement (CE) level, and its corresponding Physical Random Access Channel (PRACH) resource.

The operation 402 is to receive a random access initiated by the MTC UE over a PRACH resource corresponding to a selected CE level.

Preferable embodiments of the method for a random access of an MTC UE according to the invention will be given below.

First Embodiment

A PDCCH order transmitted by the eNB carries each CE level prescribed in the protocol, and its corresponding PRACH resource.

The network side indicates three CE levels, and their corresponding PRACH resources to the UE, and the PDCCH order carries a PRACH mask index and a preamble index of each CE level.

The UE obtains the current CE level according to current measurement, obtains the corresponding PRACH mask index and preamble according to the CE level, performs RACH transmission according to the information, and subsequently transmits according to the CE level.

If the current preamble fails to be transmitted, or fails to be transmitted, despites the largest number of attempts, then the UE will transition automatically to a CE level higher by one level, and then find the PRACH mask index and the preamble index given in the PDCCH order according to the CE level, and initiate a Contention-Free Random Access (CFRA) procedure.

Second Embodiment

A PDCCH order transmitted by the eNB carries a dedicated PRACH resource of one CE level;

The network side indicates the PRACH resource of one CE level to the UE.

The UE initiates a CFRA according to the PRACH resource configured by the network side, and its corresponding CE level.

If the current preamble fails to be transmitted, or fails to be transmitted, despites the largest number of attempts, then the UE will transition automatically to a CE level higher by one level (or a CE level according to its current real CE level), and initiate a Contention-Free Random Access (CFRA) procedure.

Third Embodiment

A PDCCH order transmitted by the eNB carries a dedicated PRACH resource of one CE level.

The network side indicates the PRACH resource of one CE level to the UE.

The current CE level of the UE is higher than the CE level indicated by the network side, and the UE initiates a CFRA over the PRACH resource corresponding to the CE level indicated by the network side.

Fourth Embodiment

A PDCCH order transmitted by the eNB carries a dedicated PRACH resource of one CE level.

The network side indicates the PRACH resource of one CE level to the UE.

The current CE level of the UE is lower than the CE level indicated by the network side, and the UE initiates a CFRA according to the current CE level thereof.

Fifth Embodiment

In this embodiment, the PDCCH order may indicate a plurality of CE levels specifically by indicating indexes of the respective CE levels, and their corresponding preamble indexes, and PRACH mask indexes in any one of the following schemes.

First Scheme

In an implementation, a CE level corresponding to each combination of a PRACH mask index and a preamble index is defined, where the combination may correspond to one CE level, or may correspond to a plurality of CE levels; and in another implementation, a combination of a PRACH mask index and a preamble index corresponding to a CE level is defined, where the CE level may correspond to one combination, or may correspond to a plurality of combinations.

Specifically a CE level field may be added to a PDCCH DCI format of the PDCCH order to indicate the specific CE level or levels corresponding to the PRACH mask index and the preamble index given in the PDCCH order; and for example, two bits are introduced as depicted in Table 2 or Table 3.

TABLE 2

| 00 | Level 0 |
| 01 | Level 1 |
| 02 | Level 2 |
| 03 | Level 3 |

TABLE 3

| 00 | Level 1 |
| 01 | Level 2 |
| 02 | Level 3 |
| 03 | All |

Alternatively codes of a plurality of bits are introduced for an additional representation of a subset, that is, the codes of the plurality of bits represent the indicated CE level, and its corresponding preamble index and PRACH mask index. In this representation, the UE searches the existing standard table for the corresponding PRACH resource according to the PRACH mask index corresponding to the indicated CE level upon reception of the PDCCH order.

In a second scheme, a dimension of the table of the PRACH mask index is added.

The table of the PRACH mask index includes a CE level, where the table depicts available values of the PRACH mask index in the table of the PRACH mask index corresponding to each CE level.

For example, the existing 16 codes are extended to 64 or 48 codes corresponding respectively to information about four CE levels (including the CE level 0) or three CE levels (precluding the CE level 0).

The implementation above may be simplified, that is, an indicator of the CE level in the DCI format is embedded into the table of the mask index similarly to the first scheme above, that is, there is an additional value of each PRACH mask index to indicate a specific CE level or several levels corresponding to the PRACH mask index and the preamble index.

In a third scheme, the CE levels are indicated implicitly via the PRACH resource index.

When the indicated PRACH resource index is applicable to specific CE levels, the UE may initiate a CFRA over any one of the resources of the CE levels.

Figure 5:
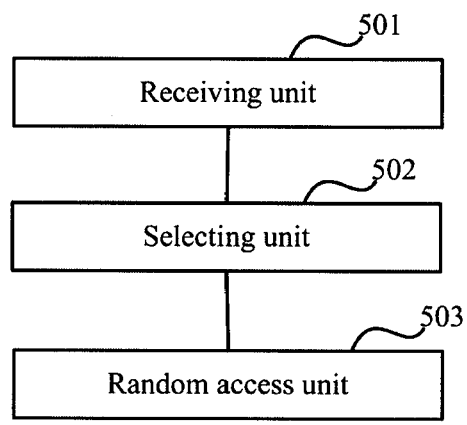
FIG. 5 is a schematic diagram of an MTC UE according to an embodiment of the invention.

An embodiment of the invention provides a Machine Type Communication (MTC) User Equipment (UE), and as illustrated in FIG. 5, the MTC UE includes: a receiving unit 501 configured to receive indication information transmitted by the network side, where the indication information indicates at least one Coverage Enhancement (CE) level, and a Physical Random Access Channel (PRACH) resource corresponding to the at least one CE level; a selecting unit 502 configured to select one CE level from a CE level of the MTC UE, and the CE level indicated by the network side, and determine a PRACH resource corresponding to the selected CE level; and a random access unit 503 configured to initiate a random access over the PRACH resource corresponding to the selected CE level.

Preferably the selecting unit configured to select one CE level from the CE level of the MTC UE, and the CE level indicated by the network side, and determine the PRACH resource corresponding to the CE level is configured to: select the CE level of the MTC UE when the current CE level of the MTC UE is among the CE levels indicated by the network side; and select the PRACH resource corresponding to the selected CE level indicated by the network side according to the CE level of the MTC UE.

Preferably the indication information indicates each CE level, and a PRACH resource corresponding to each CE level.

Preferably the indication information indicates a plurality of CE levels, and their corresponding PRACH resources. The selecting unit configured to select one CE level from the CE level of the MTC UE, and the CE levels indicated by the network side, and determine the PRACH resource corresponding to the selected CE level is configured to: select such one of the CE levels indicated by the network side that has the most approximate coverage gain to the CE level of the MTC UE when the current CE level of the MTC UE is not among the CE levels indicated by the network side; and determine the PRACH resource corresponding to the selected CE level indicated by the network side according to the selected CE level.

Preferably the indication information indicates a plurality of CE levels, and their corresponding PRACH resources. The selecting unit configured to select one CE level from the CE level of the MTC UE, and the CE levels indicated by the network side, and determine the PRACH resource corresponding to the CE level is configured to: select the CE level of the MTC UE, when the CE level of the MTC UE is not among the CE levels indicated by the network side, and a coverage gain of the CE level of the MTC UE is lower than all the CE levels indicated by the network side; and determine a PRACH resource corresponding to the CE level of the MTC UE according to a mechanism for selecting a resource of a contention random access resource.

Preferably the indication information indicates a plurality of CE levels, and their corresponding PRACH resources. The selecting unit configured to select one of the CE level of the MTC UE, and the CE levels indicated by the network side, and determine the PRACH resource corresponding to the CE level is configured to: select one of the CE levels indicated by the network side, when the CE level of the MTC UE is not among the CE levels indicated by the network side, and a coverage gain of the CE level of the MTC UE is higher than all the CE levels indicated by the network side; and determine the PRACH resource corresponding to the selected CE level indicated by the network side according to the selected CE level.

Preferably the indication information indicates one CE level, and a PRACH resource corresponding to the one CE level. The selecting unit configured to select one CE level from the CE level of the MTC UE, and the CE level indicated by the network side, and determine the PRACH resource corresponding to the CE level is configured to: select the CE level indicated by the network side when the CE level indicated by the network side is not the CE level of the MTC UE; and determine the PRACH resource corresponding to the selected CE level indicated by the network side according to the selected CE level.

Preferably the indication information indicates one CE level, and a PRACH resource corresponding to the one CE level. The selecting unit configured to select one CE level from the CE level of the MTC UE, and the CE level indicated by the network side, and determine the PRACH resource corresponding to the CE level is configured to: select the CE level indicated by the network side, when the one CE level indicated by the network side is not the CE level of the MTC UE, and a coverage gain of the CE level of the MTC UE is higher than the CE level indicated by the network side; and determine the PRACH resource corresponding to the selected CE level indicated by the network side according to the selected CE level.

Preferably the indication information indicates one CE level, and a PRACH resource corresponding to the one CE level. The selecting unit configured to select one of the CE level of the MTC UE, and the CE level indicated by the network side, and determine the PRACH resource corresponding to the selected CE level is configured to: select the CE level of the MTC UE, when the CE level indicated by the network side is not the CE level of the MTC UE, and a coverage gain of the CE level of the MTC UE is lower than all the CE levels indicated by the network side; and determine a PRACH resource corresponding to the CE level of the MTC UE according to a mechanism for selecting a resource of a contention random access.

Preferably the random access unit is further configured, when the random access fails to be initiated over the PRACH resource corresponding to the selected CE level, to: transition to a CE level with a coverage gain higher by one level; and when it is determined that the higher CE level is among the CE levels indicated by the network side, determine the PRACH resource corresponding to the higher CE level indicated by the network side according to the higher CE level, and initiate a contention-free random access over the PRACH resource; otherwise, select a PRACH resource according to a mechanism for selecting a resource of a contention random access, and to initiate a contention random access.

Preferably the indication information indicates the respective CE levels, and their corresponding PRACH resources in any one of the following schemes.

The indication information indicates indexes of the respective CE levels, and their corresponding preamble indexes and PRACH mask indexes; the indication information indicates combination indexes of combinations of the respective CE levels, and their corresponding PRACH resources, where the combination of each CE level, and its corresponding PRACH resource is pre-configured or pre-scribed in the protocol, and the combination index corresponding to each combination is pre-configured or pre-scribed in the protocol; and the indication information indicates indexes of the respective CE levels, and their corresponding PRACH mask indexes, where the preamble indexes corresponding to the respective CE levels are pre-configured.

Figure 6:
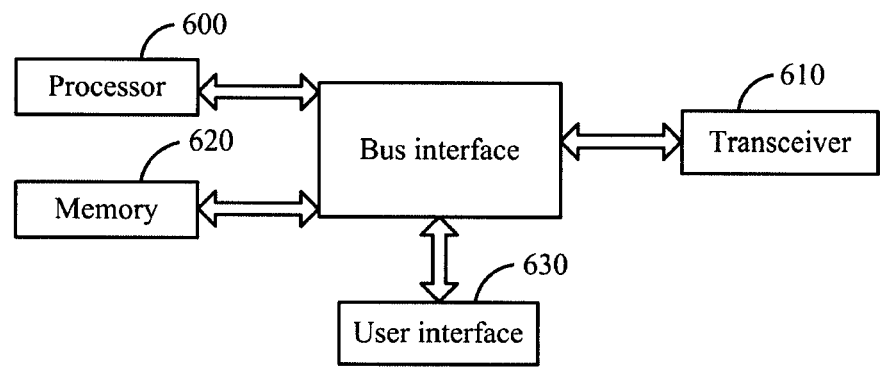
FIG. 6 is a structural diagram of another MTC UE according to an embodiment of the invention.

An embodiment of the invention further provides an MTC UE as illustrated in FIG. 6, which includes a processor 600, a transceiver 610, and a memory 620.

Where the processor 600 is configured to read programs in the memory 620 to execute the following operations: receiving indication information transmitted by the network side through the transceiver 610, where the indication information indicates at least one Coverage Enhancement (CE) level, and a Physical Random Access Channel (PRACH) resource corresponding to the at least one CE level; selecting one CE level from a CE level of the MTC UE, and the CE level indicated by the network side, and determining a PRACH resource corresponding to the selected CE level;

and initiating a random access through the transceiver 610 over the PRACH resource corresponding to the selected CE level.

The transceiver 610 is configured to be controlled by the processor 600 to receive and transmit data.

Here in FIG. 6, the bus architecture may include any number of interconnecting buses and bridges to specifically link together various circuits including one or more processors represented by the processor, and memories represented by the memory 620. The bus architecture may further link together various other circuits, e.g., peripheral devices, manostats, power management circuits, etc., all of which are well known in the art, so a further description thereof will be omitted in this context. The bus interface serves as an interface. The transceiver 610 may be a number of elements including a transmitter and a receiver, which are units for communication with various other devices over a transmission medium. For different user equipments, a user interface 630 may also be an interface via which desirable devices may be connected internally or externally, and the connected devices may include but will not be limited to a keypad, a display, a speaker, a microphone, a joystick, etc.

The processor 600 is responsible for managing the bus architecture and performing normal processes, and the memory 620 may store data for use by the processor 600 in performing the operations.

Figure 7:
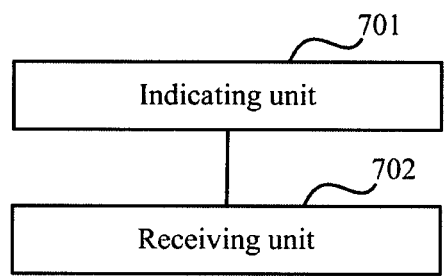
FIG. 7 is a schematic diagram of a network-side device for triggering a random access of an MTC UE according to an embodiment of the invention.

An embodiment of the invention further provides a network-side device for triggering a random access of an MTC UE, and as illustrated in FIG. 7, the device includes: an indicating unit 701 configured to transmit indication information to the MTC UE, where the indication information indicates at least one Coverage Enhancement (CE) level, and a Physical Random Access Channel (PRACH) resource corresponding to the at least one CE level; and a receiving unit 702 configured to receive a random access initiated by the MTC UE over a PRACH resource corresponding to a selected CE level.

Preferably the indication information indicated by the indicating unit indicates each CE level, and its corresponding PRACH resource prescribed in the protocol; or the indication information indicated by the indicating unit indicates a plurality of CE levels, and their corresponding PRACH resources prescribed in the protocol; or the indication information indicated by the indicating unit indicates one CE level, and its corresponding PRACH resource prescribed in a protocol.

Preferably the indicating unit indicates the respective CE levels, and their corresponding PRACH resources in any one of the following schemes.

The indicating unit indicates indexes of the respective CE levels, and their corresponding preamble indexes and PRACH mask indexes; the indicating unit indicates combination indexes of combinations of the respective CE levels, and their corresponding PRACH resources, wherein the combination of each CE level, and its corresponding PRACH resource is pre-configured or prescribed in a protocol, and the combination index corresponding to each combination is pre-configured or prescribed in a protocol; and the indicating unit indicates indexes of the respective CE levels, and their corresponding PRACH mask indexes, wherein the preamble indexes corresponding to the respective CE levels are pre-configured.

Figure 8:
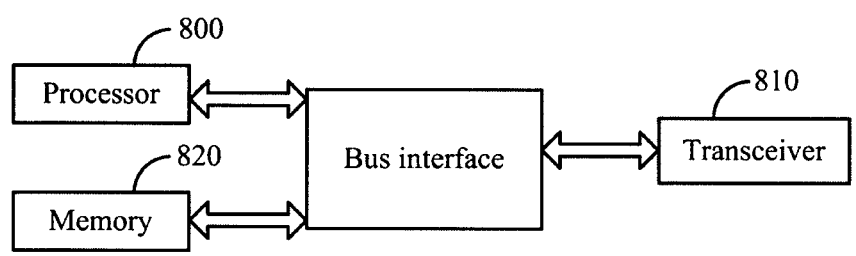
FIG. 8 is a structural diagram of an eNB according to an embodiment of the invention.

An embodiment of the invention further provides an evolved Node B as illustrated in FIG. 8, which includes a processor 800, a transceiver 810, and a memory 820.

The processor 800 is configured to read programs in the memory 820 to execute the following operations: transmitting indication information to the MTC UE through the transceiver 810, where the indication information indicates at least one Coverage Enhancement (CE) level, and a Physical Random Access Channel (PRACH) resource corresponding to the at least one CE level; and receiving a random access initiated by the MTC UE over a PRACH resource corresponding to a selected CE level through the transceiver 810.

The transceiver 810 is configured to be controlled by the processor 800 to receive and transmit data.

Here in FIG. 8, the bus architecture may include any number of interconnecting buses and bridges to specifically link together various circuits including one or more processors represented by the processor 800, and memories represented by the memory 820. The bus architecture may further link together various other circuits, e.g., peripheral devices, manostats, power management circuits, etc., all of which are well known in the art, so a further description thereof will be omitted in this context. The bus interface serves as an interface. The transceiver 810 may be a number of elements including a transmitter and a receiver, which are units for communication with various other devices over a transmission medium. The processor 800 is responsible for managing the bus architecture and performing normal processes, and the memory 820 may store data for use by the processor 800 in performing the operations.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept may make additional modifications and variations to these embodiments. Therefore the appended claims are intended to be construed as encompassing the preferred embodiments and all the modifications and variations coming into the scope of the invention.

Evidently those skilled in the art may make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for a random access of a Machine Type Communication (MTC) User Equipment (UE) the method comprising:
   receiving indication information transmitted by a network side, wherein the indication information indicates at least one Coverage Enhancement (CE) level, and a Physical Random Access Channel (PRACH) resource corresponding to the at least one CE level;
   selecting one CE level from a CE level of the MTC UE, and the at least one CE level indicated by the network side, and determining a PRACH resource corresponding to the selected CE level; and
   initiating a random access over the PRACH resource corresponding to the selected CE level;
   wherein selecting one CE level from the CE level of the MTC UE, and the at least one CE level indicated by the network side, and determining the PRACH resource corresponding to the selected CE level comprises:
   selecting the CE level of the MTC UE when the CE level of the MTC UE is among the at least one CE level indicated by the network side; and
   selecting the PRACH resource corresponding to the selected CE level indicated by the network side according to the CE level of the MTC UE.

2. The method according to claim 1, wherein the indication information indicates each CE level of the at least one CE level, and a PRACH resource corresponding to each CE level of the at least one CE level.

3. The method according to claim 1, wherein the indication information indicates a plurality of CE levels, and their corresponding PRACH resources; and
   selecting one CE level from the CE level of the MTC UE, and the CE levels indicated by the network side, and determining a PRACH resource corresponding to the selected CE level comprises:
   selecting such one of the CE levels indicated by the network side that has a most approximate coverage gain to the CE level of the MTC UE, when the CE level of the MTC UE is not among the CE levels indicated by the network side; and
   determining the PRACH resource corresponding to the selected CE level indicated by the network side according to the selected CE level.

4. The method according to claim 1, wherein the indication information indicates a plurality of CE levels, and their corresponding PRACH resources; and
   selecting one CE level from the CE level of the MTC UE, and the CE levels indicated by the network side, and determining the PRACH resource corresponding to the selected CE level comprises:
   selecting the CE level of the MTC UE, when the CE level of the MTC UE is not among the CE levels indicated by the network side, and a coverage gain of the CE level of the MTC UE is lower than all the CE levels indicated by the network side; and
   determining a PRACH resource corresponding to the CE level of the MTC UE according to a mechanism for selecting a resource of a contention random access.

5. The method according to claim 1, wherein the indication information indicates a plurality of CE levels, and their corresponding PRACH resources; and
   selecting one CE level from the CE level of the MTC UE, and the CE levels indicated by the network side, and determining the PRACH resource corresponding to the selected CE level comprises:
   selecting one of the CE levels indicated by the network side, when the CE level of the MTC UE is not among the CE levels indicated by the network side, and a coverage gain of the CE level of the MTC UE is higher than all the CE levels indicated by the network side; and
   determining the PRACH resource corresponding to the selected CE level indicated by the network side according to the selected CE level.

6. The method according to claim 1, wherein the indication information indicates one CE level, and a PRACH resource corresponding to the one CE level; and
   selecting one CE level from the CE level of the MTC UE, and the CE level indicated by the network side, and determining a PRACH resource corresponding to the selected CE level comprises:
   selecting the CE level indicated by the network side when the one CE level indicated by the network side is not the CE level of the MTC UE; and
   determining the PRACH resource corresponding to the selected CE level indicated by the network side according to the selected CE level.

7. The method according to claim 1, wherein the indication information indicates one CE level, and a PRACH resource corresponding to the one CE level; and
   selecting one CE level from the CE level of the MTC UE, and the CE level indicated by the network side, and determining a PRACH resource corresponding to the selected CE level comprises:
   selecting the CE level indicated by the network side when the one CE level indicated by the network side is not the CE level of the MTC UE, and a coverage gain of the CE level of the MTC UE is higher than the CE level indicated by the network side; and
   determining the PRACH resource corresponding to the selected CE level indicated by the network side according to the selected CE level.

8. The method according to claim 1, wherein the indication information indicates one CE level, and a PRACH resource corresponding to the one CE level; and
   selecting one CE level from the CE level of the MTC UE, and the CE level indicated by the network side, and determining a PRACH resource corresponding to the selected CE level comprises:
   selecting the CE level of the MTC UE, when the one CE level indicated by the network side is not the CE level of the MTC UE, and a coverage gain of the CE level of the MTC UE is lower than the CE levels indicated by the network side; and
   determining a PRACH resource corresponding to the CE level of the MTC UE according to a mechanism for selecting a resource of a contention random access.

9. The method according to claim 1, wherein when the random access fails to be initiated over the PRACH resource corresponding to the selected CE level, the method further comprises:
   transitioning to a CE level with a coverage gain higher by one level; and
   when it is determined that the higher CE level is among the CE levels indicated by the network side, determining the PRACH resource corresponding to the higher CE level indicated by the network side according to the higher CE level, and initiating a contention-free random access over the PRACH resource; otherwise, selecting a PRACH resource according to a mechanism for selecting a resource of a contention random access, and initiating a contention random access.

10. The method according to claim 1, wherein the indication information indicates the respective CE levels, and their corresponding PRACH resources in any one of the following schemes:
the indication information indicates indexes of the respective CE levels, and their corresponding preamble indexes and PRACH mask indexes;
the indication information indicates combination indexes of combinations of the respective CE levels, and their corresponding PRACH resources, wherein the combination of each CE level, and its corresponding PRACH resource is pre-configured or prescribed in a protocol, and the combination index corresponding to each combination is pre-configured or prescribed in a protocol; and
the indication information indicates indexes of the respective CE levels, and their corresponding PRACH mask indexes, wherein the preamble indexes corresponding to the respective CE levels are pre-configured.

11. A method for triggering a random access of a Machine Type Communication (MTC) User Equipment (UE) by a network side, the method comprising:
transmitting indication information to the MTC UE, wherein the indication information indicates at least one Coverage Enhancement, CE, level, and a Physical Random Access Channel (PRACH) resource corresponding to the at least one CE level; and
receiving a random access initiated by the MTC UE over a PRACH resource corresponding to a selected CE level;
wherein the selected CE level is a CE level of the MTC UE when the CE level of the MTC UE is among the at least one CE level indicated in the indication information, and the PRACH resource corresponding to the selected CE level is indicated in the indication information.

12. The method according to claim 11, wherein:
the indication information indicates each CE level and its corresponding PRACH resource prescribed in a protocol; or
the indication information indicates a plurality of CE levels and their corresponding PRACH resources prescribed in a protocol; or
the indication information indicates one CE level, and its corresponding PRACH resource prescribed in a protocol.

13. The method according to claim 11, wherein the indication information indicates the respective CE levels, and their corresponding PRACH resources in any one of the following schemes:
the indication information indicates indexes of the respective CE levels, and their corresponding preamble indexes and PRACH mask indexes;
the indication information indicates combination indexes of combinations of the respective CE levels, and their corresponding PRACH resources, wherein the combination of each CE level, and its corresponding PRACH resource is pre-configured or prescribed in a protocol, and the combination index corresponding to each combination is pre-configured or prescribed in a protocol; and
the indication information indicates indexes of the respective CE levels, and their corresponding PRACH mask indexes, wherein the preamble indexes corresponding to the respective CE levels are pre-configured.

14. A Machine Type Communication (MTC) User Equipment (UE) comprising a memory and at least one processor, wherein the memory is configured to store readable program codes, and the at least one processor is configured to execute the readable program codes to:
receive indication information transmitted by a network side, wherein the indication information indicates at least one Coverage Enhancement, CE, level, and a Physical Random Access Channel (PRACH) resource corresponding to the at least one CE level;
select one CE level from a CE level of the MTC UE, and the at least one CE level indicated by the network side, and determine a PRACH resource corresponding to the selected CE level; and
initiate a random access over the PRACH resource corresponding to the selected CE level;
wherein the at least one processor configured to execute the readable program codes to select one CE level from the CE level of the MTC UE, and the at least one CE level indicated by the network side, and determine the PRACH resource corresponding to the selected CE level is further configured to:
select the CE level of the MTC UE when the CE level of the MTC UE is among the at least one CE level indicated by the network side; and
select the PRACH resource corresponding to the selected CE level indicated by the network side according to the CE level of the MTC UE.

15. The MTC UE according to claim 14, wherein the indication information indicates each CE level of the at least one CE level, and a PRACH resource corresponding to each CE level of the at least one CE level.

16. The MTC UE according to claim 14, wherein the indication information indicates one CE level, and a corresponding PRACH resource corresponding to the one CE level; and
the at least one processor is further configured to execute the readable program codes to select one CE level from the CE level of the MTC UE, and the CE level indicated by the network side, and determine the PRACH resource corresponding to the selected CE level is configured to:
select the CE level indicated by the network side when the one CE level indicated by the network side is not the CE level of the MTC UE; and
determine the PRACH resource corresponding to the selected CE level indicated by the network side according to the selected CE level.

17. The MTC UE according to claim 14, wherein the at least one processor is further configured to execute the readable program codes, when the random access fails to be initiated over the PRACH resource corresponding to the selected CE level, to:
transition to a CE level with a coverage gain higher by one level; and
when it is determined that the higher CE level is among the CE levels indicated by the network side, determine the PRACH resource corresponding to the higher CE level indicated by the network side according to the higher CE level, and initiate a contention-free random access over the PRACH resource; otherwise, select a PRACH resource according to a mechanism for selecting a resource of a contention random access, and to initiate a contention random access.

18. The MTC UE according to claim 14, wherein the indication information indicates the respective CE levels, and their corresponding PRACH resources in any one of the following schemes:

the indication information indicates indexes of the respective CE levels, and their corresponding preamble indexes and PRACH mask indexes;

the indication information indicates combination indexes of combinations of the respective CE levels, and their corresponding PRACH resources, wherein the combination of each CE level, and its corresponding PRACH resource is pre-configured or prescribed in a protocol, and the combination index corresponding to each combination is pre-configured or prescribed in a protocol; and the indication information indicates indexes of the respective CE levels, and their corresponding PRACH mask indexes, wherein the preamble indexes corresponding to the respective CE levels are pre-configured.

* * * * *